US008381087B1

(12) United States Patent
Hickman et al.

(10) Patent No.: US 8,381,087 B1
(45) Date of Patent: Feb. 19, 2013

(54) AUTOMATED ELECTRONIC DOCUMENT FILING SYSTEM, METHOD, AND ARTICLE OF MANUFACTURE

(75) Inventors: Paul L. Hickman, Los Atlos Hills, CA (US); James J. Gough, Ben Lomond, CA (US)

(73) Assignee: G&H Nevada-Tek, Los Altos, CA (US)

( * ) Notice: Subject to any disclaimer, the term of this patent is extended or adjusted under 35 U.S.C. 154(b) by 2038 days.

(21) Appl. No.: 09/625,300

(22) Filed: Jul. 24, 2000

Related U.S. Application Data

(60) Provisional application No. 60/145,605, filed on Jul. 26, 1999.

(51) Int. Cl.
*G06N 3/00* (2006.01)
(52) U.S. Cl. ........................................... 715/205
(58) Field of Classification Search ............... 715/500.1, 715/205, 224, 226, 234; 705/35; 707/10, 707/3, 104.1; 706/45, 46, 47
See application file for complete search history.

(56) References Cited

U.S. PATENT DOCUMENTS

| | | | |
|---|---|---|---|
| 4,200,770 A | | 4/1980 | Hellman et al. |
| 5,276,869 A | | 1/1994 | Forrest et al. |
| 5,347,477 A | * | 9/1994 | Lee ................................ 708/141 |
| 5,410,646 A | | 4/1995 | Tondevold et al. |
| 5,604,802 A | * | 2/1997 | Holloway ........................ 705/66 |
| 5,608,874 A | | 3/1997 | Ogawa et al. |
| 5,636,280 A | | 6/1997 | Kelly |
| 5,673,316 A | | 9/1997 | Auerbach et al. |
| 5,694,616 A | | 12/1997 | Johnson et al. |
| 5,724,574 A | | 3/1998 | Stratigos et al. |
| 5,732,219 A | * | 3/1998 | Blumer et al. ................. 709/227 |
| 5,739,512 A | | 4/1998 | Tognazzini |
| 5,740,361 A | * | 4/1998 | Brown .......................... 713/201 |
| 5,748,738 A | | 5/1998 | Bisbee et al. |

(Continued)

FOREIGN PATENT DOCUMENTS

JP 411143936 A 5/1999

OTHER PUBLICATIONS

National University of Singapore, Singapore, Singapore, "Content-based Retrieval for Trademark Registration", Nov. 3, 1996.*

(Continued)

*Primary Examiner* — Kyle Stork
(74) *Attorney, Agent, or Firm* — TIPS Group

(57) ABSTRACT

An automated electronic filing system including a web server coupled to a wide area network, a receiving agency server coupled to the wide area network, and a client machine coupled to the wide area network for communication with the web server. The web server serves as an interface to the receiving agency server, the client machine providing information to the web server forming at least a part of an electronic document to be filed with the receiving agency server by the web server. The web server and the receiving agency server can communicate directly with each other without going through the wide area network, such as via a local area network (not shown) or by a direct connection between the servers (also not shown). Preferably, the web server and the receiving agency server communicate with each other over the wide area network, which is preferably a TCP/IP protocol network such as the Internet. A method for electronically filing documents in accordance with the present invention includes providing an HTML based form to a client machine coupled to a TCP/IP network, at least partially automatically filling-in the form based upon input from the client machine, verifying information on the form based upon stored heuristics, and submitting the form to a receiving agency over the network. Additional information is usually added to the form based upon input from the client machine prior to verifying the information.

8 Claims, 12 Drawing Sheets

U.S. PATENT DOCUMENTS

| | | | |
|---|---|---|---|
| 5,754,840 | A | 5/1998 | Rivette et al. |
| 5,758,324 | A * | 5/1998 | Hartman et al. |
| 5,778,352 | A | 7/1998 | Inoue et al. |
| 5,790,790 | A | 8/1998 | Smith et al. |
| 5,848,161 | A | 12/1998 | Luneau et al. |
| 5,850,442 | A | 12/1998 | Muftic |
| 5,857,191 | A * | 1/1999 | Blackwell et al. |
| 5,867,665 | A | 2/1999 | Butman et al. |
| 5,870,473 | A | 2/1999 | Boesch et al. |
| 5,875,432 | A | 2/1999 | Sehr |
| 5,915,093 | A * | 6/1999 | Berlin et al. |
| 5,930,471 | A | 7/1999 | Milewski et al. |
| 5,956,489 | A | 9/1999 | San Andres et al. |
| 5,982,898 | A | 11/1999 | Hsu et al. |
| 5,987,429 | A | 11/1999 | Maritzen et al. |
| 6,014,663 | A | 1/2000 | Rivette et al. |
| 6,016,479 | A | 1/2000 | Taricani, Jr. |
| 6,023,684 | A * | 2/2000 | Pearson |
| 6,064,723 | A * | 5/2000 | Cohn et al. |
| 6,073,105 | A | 6/2000 | Sutcliffe et al. |
| 6,092,102 | A | 7/2000 | Wagner |
| 6,105,012 | A | 8/2000 | Chang et al. |
| 6,105,056 | A | 8/2000 | Gilchrist et al. |
| 6,122,622 | A * | 9/2000 | Wiitala et al. ............... 705/28 |
| 6,138,162 | A | 10/2000 | Pistriotto et al. |
| 6,151,609 | A | 11/2000 | Truong |
| 6,154,840 | A | 11/2000 | Pebley et al. |
| 6,161,146 | A | 12/2000 | Kley et al. |
| 6,182,124 | B1 | 1/2001 | Lau et al. |
| 6,185,683 | B1 | 2/2001 | Ginter et al. |
| 6,192,165 | B1 | 2/2001 | Irons |
| 6,192,407 | B1 | 2/2001 | Smith et al. |
| 6,195,686 | B1 | 2/2001 | Moon et al. |
| 6,212,553 | B1 | 4/2001 | Lee et al. |
| 6,230,156 | B1 | 5/2001 | Hussey |
| 6,237,096 | B1 | 5/2001 | Bisbee et al. |
| 6,289,460 | B1 | 9/2001 | Hajmiragha |
| 6,297,891 | B1 | 10/2001 | Kara |
| 6,298,327 | B1 | 10/2001 | Hunter et al. |
| 6,314,415 | B1 * | 11/2001 | Mukherjee ............... 706/47 |
| 6,314,425 | B1 | 11/2001 | Serbins et al. |
| 6,314,454 | B1 | 11/2001 | Wang et al. |
| 6,324,648 | B1 | 11/2001 | Grantges, Jr. |
| 6,341,353 | B1 | 1/2002 | Herman et al. |
| 6,345,278 | B1 * | 2/2002 | Hitchcock et al. ......... 707/100 |
| 6,363,361 | B1 | 3/2002 | Lundberg |
| 6,424,995 | B1 | 7/2002 | Shuman |
| 6,434,580 | B1 * | 8/2002 | Takano et al. ............ 715/255 |
| 6,477,578 | B1 | 11/2002 | Mhoon |
| 6,493,722 | B1 * | 12/2002 | Daleen et al. ............ 707/104.1 |
| 6,496,931 | B1 | 12/2002 | Rajchel et al. |
| 6,589,290 | B1 | 7/2003 | Maxwell et al. |
| 6,671,805 | B1 * | 12/2003 | Brown et al. ............ 713/176 |
| 7,350,071 | B1 | 3/2008 | Reisman |
| 2001/0011250 | A1 * | 8/2001 | Paltenghe et al. ........... 705/41 |
| 2002/0059235 | A1 | 5/2002 | Jecha et al. |
| 2002/0059245 | A1 | 5/2002 | Zakharov et al. |

OTHER PUBLICATIONS

Woodcock Washburn Kurtz Mackiewicz & Norris LLP ("Woodcock Washburn Pioneers Electronic Filing of Trademark Registrations; Local Firm First to File Electronically", Dec. 1, 1997).*

Kirk, "Washington State: First State to Pioneer Web Tax Filing and Payment," The Journal of Electronic Commerce, 1998.*

Yum et al., "An Utility Company's Experience on Electronic Filing System for Engineering Applications," IEE 2nd International Conference on Advances in Power Systems Control, Operation and Management, 1993.*

Hampton, "Expansion of Pilot of Electronic Filing of Trademark Applications," Sep. 25, 1998.*

L. Masinter, "Returning Values From Forms: Multipart/Form-Data", Network Working Group, Xerox Corporation, Aug. 1998, http://www.ietf.org/rfc/rfc2388.txt.

A.O. Freier, P. Karlton, P.C. Kocher, "The SSL Protocol Version 3.0 Internet Draft", Netscape Communication, Mar. 1996, http://wp.netscape.com/eng/ssl3/ssl-toc.html.

"105th Congress Enacts Major IT Laws", Nov. 1998, Computer Law and Tax Report, pp. 1-6.

Skillman, Brad, "Fired up at the IRS", *Accounting Technology*, Jan. 1998, v.14 n. 1, p. 12-20.

van der Hof, Simone et al., "Documentation in the Digital Age", *Security Management*, Apr. 1998, v.42 n. 4, p. 59-63.

Wolosky, Howard, "New Law Goes Way Beyond IRS Revamping", *Practical Accountant*, Aug. 1998, v. 31 n. 8, p. 20-23.

Yum et al., "An Utility Company's Experience on Electronic Filing System for Engineering Applications," IEE $2^{nd}$ International Conference on Advances in Power Systems Control, Operations and Management, 1993.

Woodcock Washburn Kurtz Mackiewicz & Norris LLP ("Woodcock Washburn Pioneers Electronic Filing of Trademark Registrations; Local Firm First to File Electronically", Dec. 1, 1997.

National University of Singapore, Singapore, Singapore, "Content-based Retrival for Trademark Registration", Nov. 3, 1996.

Muller, Nathan J., "Desktop Encyclopedia of the Internet", Artech House, Inc., 1999, all pages.

Szymanski, Jim, "Identity Theft Grows a Lot Faster Than Police Can React", The News Tribune, Tacoma, Wash., May 16, 1999, all pages.

"The ID Thieves Want You; New laws are needed to deal with identity-related fraud", Los Angeles Times, Los Angeles, Calif., Jun. 15, 1998, all pages.

Menezes et al., "Handbook of Applied Cryptography", CRC Press LLC, 1997, all pages.

"Adobe Acrobat 4.0 User Guide", Adobe Systems Inc., 1999, all pages.

"U.S. Individual Income Tax Return 1040", 1998, US Internal Revenue Service, 1998 forms.

"Intuit Announces the Internet's Most Complete Online Tax Solution for Consumers", Intuit press release, Feb. 18, 1998, all pages.

"An Introduction to Cryptography" Network Associates, Inc. Jun. 1999. All pages.

Derfler, "How Networks Work", Millennium Edition, 2000, Que Corporation Indianapolis, IN, all pages.

White, "How Computers Work", Millennium Edition, 1999, Que Corporation Indianapolis, IN, all pages.

Gralla, "How the Internet Works", Millennium Edition, 1999, Que Corporation Indianapolis, IN, all pages.

PGP Windows 95, 98 and NT User's Guide Version 6.0, 1998 Network Associates, Inc., all pages.

Arthur Purcell, James Fullton, Richard Fischer, "Electronic Patent Application Filing System: A Demostration Project of the U.S. Patent and Trademark Office", Spring 1998, Jurimetrics Journal, 38 Jurimetrics J. 407.

M. Muramtsu et al., "The Construction of the Paperless System in Japan Patent Office", 1992, NTT Data Communication System Corporation, IEEE/Systems Integration, 1992 ICSI '92, Proceedings of the International Conference, 278-287.

John R.S. Orange, "Filing Patent Applications Electronically: Practical Aspects and Legal Aspects of "EASY"", 1994, Sim & McBurney, Toronto, Canada.

Ecom Today, "Practical Demonstration Project for Electronic Patent Application over the Internet", 1994, Ecom Today No. 5.

Author anonymous, "Cyberspace May Render Notaries Obsolete", Times Union, Albany: Mar. 17, 1996, downloaded from the Internet on Oct. 20, 2003.

1997-1998 Annual Report of Committee 754, Section of Intellectual Property Law, American Bar Association, copyright 1998. Downloaded from the Internet http://www.abanet.org/intelprop/97-98rep/754.html on May 20, 2004. 10 pages.

* cited by examiner

Are you an existing client of Hickman, Stephens and Coleman with an Trademark Application Client Number?

*If yes, please enter:*

Client ID Number _____

Password _____

Forgot your Client ID or your Password? Enter your email address here! _____

| Log In | Reset |

*If no, please enter:*

Name _____

Company/Firm _____

Address Line 1 _____

Address Line 2 _____

City _____

State [Select State ▼]   If not listed, please choose 'OTHER' and enter it here: _____

Country [Select Country ▼]   If not listed, please choose 'OTHER' and enter it here: _____

Zip Code _____

Telephone Number _____

Fax Number _____

Email Address _____

Select a Password _____

Confirm Password _____

Are you an attorney filing trademark applications for clients? ⬜ Yes

| SUBMIT | Reset Form |

Fig. 4A

Are you an existing client of Hickman, Stephens and Coleman with an Trademark Application Client Number?

*If yes, please enter:*

| | |
|---|---|
| Client ID Number | NEO1 |
| Password | ******** |
| Forgot your Client ID or your Password? Enter your email address here! | mgough@neostar.com |

[ Log In ] [ Reset ]

*If no, please enter:*

| | |
|---|---|
| Name | Michael Gough |
| Company/Firm | Neostar, Inc. |
| Address Line 1 | 8131 Harvard Drive |
| Address Line 2 | |
| City | Ben Lomond |
| State | California ▼ |
| Country | USA ▼ |
| Zip Code | 95005 |
| Telephone Number | 831-336-2919 |
| Fax Number | 831-331-2919 |
| Email Address | mgough@neostar.com |
| Select a Password | ******** |
| Confirm Password | ******** |

If not listed, please choose 'OTHER' and enter it here: (for State)

If not listed, please choose 'OTHER' and enter it here: (for Country)

Are you an attorney filing trademark applications for clients? ✓ Yes

[ SUBMIT ] [ Reset Form ]

Fig. 4B

Please select an applicant from your applicant pool, or select 'OTHER' to create a new applicant profile.

Select Applicant ▼

*Applicant Name* [                    ]
*Company/Firm* [                    ]
*Address Line 1* [                    ]
*Address Line 2* [                    ]
*City* [              ]
*State* [ Select State ▼ ]   If applicant's state not listed, please choose 'OTHER' and enter it here: [              ]

*Country* [ Select Country ▼ ]   If applicant's country not listed, please choose 'OTHER' and enter it here: [              ]

*Zip Code* [          ]
*Telephone Number* [              ]
*Fax Number* [              ]
*Email Address* [              ]

*Applicant is a(n):* ○ Individual  ○ Corporation  ○ Partnership  ○ Other

*State or Country of Incorporation, Citizenship or Organization* [              ]

*If 'Partnership' is selected, enter names and citizenship of all partners. If 'Other' is selected, enter entity type:* [                    ]

Do you wish to save any changes you have made to this applicant profile? ☐ *Yes*

[ Next> ] [ Reset ]

*Fig. 5A*

Please select an applicant from your applicant pool, or select 'OTHER' to create a new applicant profile.

[ OTHER ▼ ]

*Applicant Name:* Michael Gough
*Company/Firm:* Neostar, Inc
*Address Line 1:* 8131 Harvard Drive
*Address Line 2:*
*City:* Ben Lomond
*State:* California ▼

If applicant's state not listed, please choose 'OTHER' and enter it here:
[          ]

*Country:* USA ▼

If applicant's country not listed, please choose 'OTHER' and enter it here:
[          ]

*Zip Code:* 95005
*Telephone Number:* 831-336-2919
*Fax Number:* 831-336-2919
*Email Address:* mgough@neostar.com

*Applicant is a(n):* ○ Individual  ● Corporation  ○ Partnership  ○ Other

*State or Country of Incorporation, Citizenship or Organization* [ Nevada, USA ]

*If 'Partnership' is selected, enter names and citizenship of all partners. If 'Other' is selected, enter entity type:*

[                    ]

Do you wish to save any changes you have made to this applicant profile? ☑ *Yes*

[ Next> ] [ Reset ]

*Fig. 5B*

| Applicant Information | | | |
|---|---|---|---|
| Please use the Wizard if there are multiple applicants. | | | |
| * Name | Jim Gough | | |
| * Entity Type: Click on the one appropriate circle to indicate the applicant's entity type and enter the corresponding information. | | | |
| ⦿ Individual | Country of Citizenship | USA | |
| ○ Corporation | State or Country of Incorporation | | |
| ○ Partnership | State or Country Where Organized | | |
| | Name and Citizenship of all General Partners | | |
| ○ Other | Specify Entity Type | | |
| | State or Country Where Organized | | |
| * Address | * Street Address | 8131 Harvard Drive | |
| | * City | Bel Lomond | |
| | State | California | If not listed above, please select 'OTHER' and specify here: |
| | * Country | USA | If not listed above, please select 'OTHER' and specify here: |
| | Zip/Postal Code | 95005 | |
| * Phone Number | 831-336-2919 | | |
| Fax Number | | | |
| Internet E-Mail Address | wheresjim@dog.com | | |

Fig. 6

☑ Check here if an attorney is filing this application on behalf of applicant(s). Otherwise, click on Domestic Representative to continue.

| Attorney Information | | | |
|---|---|---|---|
| Correspondent Attorney Name | | | |
| Individual Attorney Docket/Reference Number | | | |
| Other Appointed Attorney(s) | | | |
| Attorney Address | Street Address | | |
| | City | | |
| | State | Select State | |
| | | If not listed above, please select 'OTHER' and specify here: | |
| | Country | Select Country | |
| | | If not listed above, please select 'OTHER' and specify here: | |
| | Zip/Postal Code | | |
| Firm Name | | | |
| Phone Number | | | |
| FAX Number | | | |
| Internet E-Mail Address | | | |

☐ Check here if the applicant has appointed a Domestic Representative. A Domestic Representative is REQUIRED if the applicant's address is outside the United States. Otherwise, click on Fee Information to continue.

| Domestic Representative | | | |
|---|---|---|---|
| The applicant must appoint a Domestic Representative if the applicant's address is outside the United States. The following is hereby appointed applicant's representative upon whom notice or process in the proceedings affecting the mark may be served. | | | |
| Representative's Name | | | |
| Address | Street Address | | |
| | City | | |
| | State | Select State | |
| | | If not listed above, please select 'OTHER' and specify here: | |
| | Zip Code | | |
| Phone Number | | | |
| FAX Number | | | |
| Internet E-Mail Address | | | |

Fig. 7

| | |
|---|---|
| | **\* Basis for Filing Application** |
| Check basis/bases which apply, but never both 1(b) and 1(a). | |
| ☒ | Section 1(b), Intent to Use: Applicant has a bona fide intention to use the mark in commerce on or in connection with the above identified goods and services. (15 U.S.C. §1051(b), as amended). Applicant intends to use the mark on the goods, on labels or packaging for the goods, on displays associated with the goods, as a configuration of the goods, or in other ways customary in the trade; or for services in connection with the rendering or advertising of the services, or in other ways customary in the trade. |
| ☐ | Section 1(a), Use in Commerce: Applicant is using or is using through a related company the mark in commerce on or in connection with the above identified goods and services. 15 U.S.C §1051(a), as amended. Applicant uses or uses through a related company the mark on the goods, on labels or packaging for the goods, on displays associated with the goods, as a configuration of the goods, or in other ways customary in the trade; or for services in connection with the rendering or advertising of the services, or in other ways customary in the trade. Applicant attaches one specimen for *each class* showing the mark as used in commerce on or in connection with any item in the class of listed goods and/or services. If filing electronically, applicant must attach a JPG or GIF specimen image file for each international class, regardless of whether the mark itself is in a typed drawing format or is in a stylized format or a design. |
| | Specimen Image File<br><br>Click on the 'Browse' button to select GIF or JPG image file that contains the specimen from applicant's local drive.<br>[Browse] |

| | | |
|---|---|---|
| Date of First Use of Mark Anywhere | 12/1/99<br>MM/DD/YYYY | |
| Date of First Use of Mark in Commerce | 12/1/99<br>MM/DD/YYYY | |
| Type of Commerce | Only the three types of commerce listed below will support a registration under Section 1(a). Check the one that applies.<br>☒ Interstate<br>☐ Territorial<br>☐ Commerce between the United States and [_____] [enter specific foreign country] | |

| | |
|---|---|
| ☐ | Section 44(d), Priority based on foreign filing: Applicant has a bona fide intention to use the mark in commerce on or in connection with the above identified goods and/or services, and asserts a claim of priority based upon a foreign application in accordance with 15 U.S.C. §1126(d), as amended. |
| Country of Foreign Filing | Select Country ▼<br>If not listed above, please select 'OTHER' and specify here: |
| Foreign Application Number | |
| Filing Date of Foreign Application | MM/DD/YYYY |

Fig. 8

| | Mark Information |
|---|---|
| colspan="2" | Please note that the Office will generate the appropriate drawing page based on the information provided below. |
| ⊙ | Click on this circle if the Mark is displayed in the typed drawing format. |
| ○ | Click on this circle if the mark is stylized (i.e., not displayed in a typed format), or if the mark includes or is composed of a design. IMPORTANT- See Stylized Form or Design to learn about the requirements for a drawing page of a stylized or design mark. Additionally, you must attach a black-and-white mark image file (no color) to the application.<br><br>Click on the 'Browse' button to select GIF or JPG image file from applicant's local drive.<br>[       Browse      ] |
| * Mark | wheresjim |
| Additional Statement | Click on the 'pull-down' box below to view a listing of various statements which may pertain to the application. If one or more of these statements applies, click on the appropriate entry to generate the full text of that statement in the 'Additional Statement' box:<br>Select a Statement      [Clear Statement] |

| Goods and/or Services | |
|---|---|
| colspan="2" | Please use the Wizard if the goods and/or services are classified in more than one class. |
| colspan="2" | Applicant requests registration of the trademark/ service mark shown in the accompanying drawing (or identified above) with the Patent and Trademark Office on the Principal Register established by the Act of July 5, 1946 (15 U.S.C. §1051 et seq., as amended) for the following Class(es) and Goods and Services: |
| International Class | |
| * Listing of Goods and/or Services | |

Fig. 9

The application will not be "signed" in the sense of a traditional paper document. To verify the contents of the application, the appropriate person (i.e., the individual applying, or a corporate officer or general partner of the applicant, and not the applicant's attorney) must enter any combination of alpha/numeric characters that has been specifically adopted to serve the function of the signature, preceded and followed by the forward slash (/) symbol. Acceptable "signatures" could include: /john doe/; /harry123/; and /123-4567/. The application may still be verified to check for missing information or errors even if the signature and date signed fields are left blank. For additional information, click on "Signature" below.

\* Signature [_____]   \* Date Signed [_____] MM/DD/YYYY

\* Signatory's Name [_____]

Signatory's Position [_____]

Click on the desired action:

[Validate Form]     [Reset Form]

Note: To either print the completed application, in whole or in part, download and save the validated application, or electronically submit the application to the USPTO, click on the Validate Form button.

Fig. 10

AUTOMATED ELECTRONIC DOCUMENT FILING SYSTEM, METHOD, AND ARTICLE OF MANUFACTURE

CROSS REFERENCE TO RELATED APPLICATIONS

This application claims the benefit of co-pending provisional patent application No. 60/145,605, filed Jul. 26, 1999, incorporated herein by reference.

BACKGROUND OF THE INVENTION

This invention relates generally to the electronic filing of documents with governmental agencies, and more particularly to the filing of legal documents over an unsecured network such as the Internet.

An increasing number of governmental agencies allow the electronic filing of legal documents. For example, a number of courts allow legal documents, such as complaints and briefs, to be electronically filed. As another example, the United States Patent and Trademark Office (USPTO) has had an Electronic Trademark Application filing system available since early 1999, and is planning an Electronic Patent Application filing system in the near future.

There are a number of issues with electronic document filing systems. A major issue is security. Since many of these systems use an unsecured wide area network (WAN) such as the Internet for the delivery of the documents, there is legitimate client, agency, and attorney concerns as to the security of the transmitted data comprising these electronic documents. Encryption is one way to address these issues, but it creates a whole new set of issues such as security levels, standards, ease of use, etc.

Another issue with electronic document filing systems is that of authentication. Most paper documents must be signed in order to be effective. Electronic signatures have been suggested and used for electronic filing systems, but these too raise additional issues of verification, standards, ease of use, etc. In some cases, the requirements of electronic signatures have been so great that clients are reluctant to use the electronic document filing systems.

Electronic filing systems of the prior art tend to require a considerable amount of human intervention in formatting, transmitting, and processing the electronic documents. In some instances, it is actually faster to prepare documents for manual, or paper, filing than it is to prepare documents for electronic filing. In addition to sometimes cumbersome requirements, the content of electronic documents are often created from scratch for each electronic filing transaction, eliminating some economies that would be provided by a more automated system.

A still further problem with electronic document filing systems is that they often require immediate payment. For example, some electronic document filing systems require that requisite fees be immediately charged to a credit card. This is a problem with some clients, particularly large corporations, which typically are not set-up for purchases of this type.

There are instances where a client works through multiple levels of representation. For example, a client may have a general counsel who directs a patent counsel to file an electronic document with the USPTO. As another example, a foreign client may instruct a foreign trademark attorney to instruct a U.S. trademark attorney to file a trademark application with the USPTO. It has been difficult to handle these multiple levels of representation in the past with electronic document filing systems, since such systems tend to infer that the client or its immediate representative is the one actually electronically filing the document.

SUMMARY OF THE INVENTION

In the present invention, a secure web site of, for example, the World Wide Web system of the Internet, is used as an intermediary between a client and an electronic document filing system. As used here, the "client" will be referred to as the entity who initiates the transaction with the secure web site, as opposed to the "applicant" for whom the electronic document is being filed. Of course, the applicant may be the client, or the applicant may be working directly or indirectly with the client. At least the critical transactions between the client and the secure web site, and the applicant and the secure web site (if any), are encrypted to provide data privacy.

In operation, a client logs onto the secure web site, and selects the type of electronic document that is to be filed. Based upon stored information concerning the client and/or the applicant, the appropriate electronic form is automatically filled-in to the extent possible. The client then modifies the electronic form. Preferably, the electronic form is checked for completeness and accuracy in an automated fashion by the secure web site. When completed, the applicant (who may or may not be the client) is alerted that an electronic signature is desired. After the electronic signature is applied to the electronic form, it is forwarded to the appropriate filing agency. Any requisite fee is automatically paid by the secure web site. Confirmation is preferably received from the receiving agency by the secure web site, and appropriate confirmation is provided to the client and/or applicant. Preferably, docketing information is automatically updated by the secure web site, and any follow-up documentation (such a documents bearing actual client and/or applicant signatures) are automatically generated and provided to the appropriate individuals. This follow-up documentation can be, in some instances, be returned and forwarded in electronic form, although in other instances it is printed out, signed, and forwarded either directly or indirectly to the appropriate receiving agency.

An advantage of the present invention is that all communications between a client, an applicant, and the secure web site takes place in a secure fashion, preferably by encryption. This reduces the worry and danger involved with adding an extra layer of interaction into an electronic document filing system.

Another advantage of the present invention is that an electronic signature requirement is handled automatically, even if the client and the signer (e.g. the applicant) are at different locations. Once the electronic signature has been applied, the completed electronic document can be automatically filed without further human interaction.

The present invention also greatly automates the electronic document assembly and delivery. For example, the use of previously entered client and/or applicant information is automatically inserted into the electronic document, reducing time and possible errors.

The secure web site is also capable of handling the financial transactions required by the receiving agency. For example, if the receiving agency requires electronic fund transfers (EFT) or credit cards to perfect the filings of the electronic documents, the secure web site provides the necessary funds or credit, and then charges back the charges to the client. This can be accomplished by accepting the client's credit card, debiting a client's deposit account, or by simply billing the client.

The present invention also facilitates the filing of electronic documents through multiple levels of representation. The client interacts directly with the secure web site. However, the applicant preferably interacts with the secure web site in a transparent fashion such that it believes that it is dealing with its representative, the client. In this way, the client is the sole representative of the applicant and becomes the applicant's interface for the transaction.

These and other advantages of the present invention will become apparent to those skilled in the art upon a reading of the following descriptions of the invention and a study of the several figures of the drawing.

BRIEF DESCRIPTION OF THE DRAWINGS

FIGS. 4A, 4B, 5A, 5B, and 6-10 illustrates a number of blank and partially filled-in HTML used to create a form electronic document that can be filed by the method, system, and article of manufacture of the present invention.

DETAILED DESCRIPTION OF THE PREFERRED EMBODIMENTS

Figure 1:
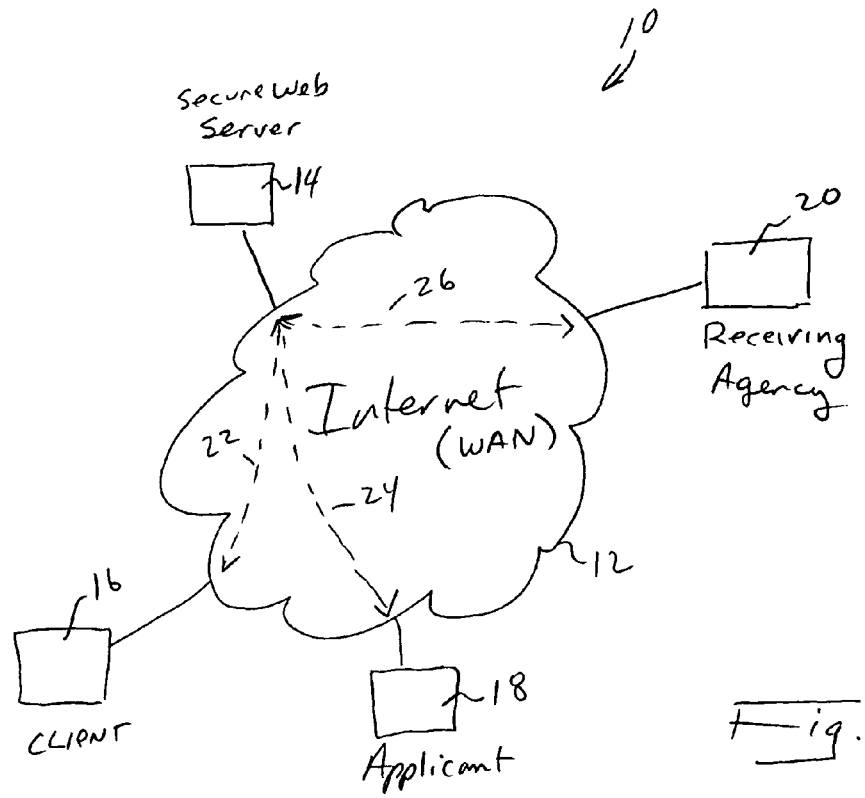
FIG. 1 is a conceptual view of a client and an applicant interacting with a secure web site over the Internet in order to file an electronic document with a receiving agency, also over the Internet, in accordance with the present invention.

In FIG. 1, a system 10 for the delivery of electronic documents includes a wide area network (WAN) 12, such as the Internet, a secure web server 14, a client computer 16, an optional applicant computer 18, and a receiving agency computer 20. Most preferably, the client computer 16 and (optionally) the applicant computer 18 can communicate with the secure web server 14 through secure communication links 22 and 24, respectively, over the WAN 12. Alternatively, but not preferably, the communication links 22 and 24 can be not secure. The secure web server 14 can communicate with the receiving agency computer 20 through a communication link 26 over the WAN 12. The communication link 26 is secure or not secure depending upon the required protocols of the receiving agency computer 20.

By "secure" it is meant herein that communications over the communication links between servers and computers are protected against interception and deciphering. In an open WAN such as the Internet, this is typically accomplished through some level of encryption. Alternatively, dedicated communication links separate from the Internet as well as "secure socket" technologies have also been used to provide secure communications. However, in the present invention the use of standard Internet transmission technologies and encryption techniques are the preferred methods and apparatus for secure communications 22, 24, and possibly 26 (depending upon the requirements of the receiving agency). Methods for providing secure communications are well known to those skilled in the art, and therefore will not be discussed herein in any detail.

By "Internet" it is meant a WAN operating on Internet standard TCP/IP protocols. Networks using TCP/IP protocols come in many varieties, sometimes referred to as Intranets, Extranets, etc. Furthermore, other networking technologies if implemented as a WAN accessible by servers, clients, applicants, and receiving agencies are also suitable for the present invention.

The secure web server 14, client computer 16, applicant computer 18, and receiving agency 20 are all preferably implemented with one or more computer systems. Such computer systems can range from simple network computers (NCs), personal computers (PCs), workstations, minicomputers, mainframe computers, and supercomputers. Typically, the client computer 16 and applicant computer 18 are PCs, such as Microsoft/Intel compatible personal computers, or Macintosh personal computers made by Apple Computer, Inc. Server 14 can also be a personal computer, although it is often a workstation computer made by such vendors as Sun Microsystems, Inc., SGI, Inc., and Hewlett Packard Company. The receiving agency computer 20 is often at least a workstation computer, and can be an even larger computer depending upon its required performance.

The system 10 therefore includes a plurality of computers of one type or another connected together by a WAN. Each computer includes a central processing unit (CPU) such as an Intel-compatible microprocessor, random access memory, input/output circuitry, and permanent memory store, as will be appreciated by those skilled in the art. Aspects of the present invention may be implemented on such computer systems as systems, methods, and articles of manufacture. For example, the computers in combination with the WAN form a system that embodies the present invention. Further, a computer implemented process or method embodies the present invention, and computer readable medium (such as random access memory of the computer, permanent memory stores such as disk drives and CD-ROM, and media readable over the WAN) can store code segments which implement the present invention.

It will therefore be appreciated that the present invention provides an automated electronic filing system including a web server 14 coupled to a wide area network 12, a receiving agency server 20 coupled to the wide area network 12, and a client machine 16 coupled to the wide area network 12 for communication with the web server 14. By "server" it is meant a computing apparatus (such as a computer) that can provide server functions. By "machine" it is meant a computing device (such as a computer) that can serve as a workstation for one or more persons.

The web server 14 serves as an interface to the receiving agency server 20, the client machine 16 providing information 22 to the web server 14 forming at least a part of an electronic document to be filed with the receiving agency server 20 by the web server 14. The web server 14 and the receiving agency server 20 can communicate directly with each other without going through the wide area network, such as via a local area network (not shown) or by a direct connection between the servers (also not shown). Alternatively, the web server 14 and the receiving agency server 20 can be implemented on the same machine. However, a preferred embodiment of the present invention has the web server 14 and the receiving agency server 20 communicate with each other over the wide area network 12, which is preferably a TCP/IP protocol network such as the Internet. Other suitable TCP/IP protocol networks include Intranets, Extranets, etc., as will be appreciated by those skilled in the art. In addition, the wide area network 12 can include non-TCP/IP protocol networks and transmission media.

In the present invention, the web server 14 and the client machine 16 preferably communicate with each other over the wide area network 12. It is preferable that communications between the client machine 16 and the web server 14 are at least partially encrypted. That is, sensitive information, such as non-public information, credit card information, etc. is preferably encrypted. Techniques for encrypting data are well known to those skilled in the art. It is also preferable that communications between the client machine 16 and the web server 14 are subject to authentication using, for example, certificates. The use of certificates for authentication is, again, well known to those skilled in the art.

Also preferably, the web server 14 transacts a financial transaction with the receiving agency server 20 on behalf of the client machine 16. For example, credit card or deposit account information can be transmitted to the receiving agency computer from the secure web server 14. This has the advantage of not requiring that the client or applicant provide this form of payment, i.e. they can be billed for the service. Alternatively, the client machine 16 and/or applicant machine 18 can provide payment to the web server 14 in repayment for its services and advanced fees.

Still further, it is preferable that the web server 14 automatically provides a portion of the electronic document in response to a selection originating from the client machine 16. This is typically accomplished by providing the client machine 16 with a form (typically an HTML form) that can be at least partially automatically filled-in in response to the selection. This automatic fill feature will be discussed in greater detail subsequently.

In certain embodiments of the present invention, the applicant machine 18 is coupled to the wide area network. In other embodiments, the applicant machine 18 and the client machine 16 are the same machine. The applicant machine 18 can communicate with the web server 14 over the wide area network 12. Preferably, these communications between the applicant machine 14 and the web server 14 are at least partially encrypted. Furthermore, communications between the applicant machine 18 and the web server 14 may be subject to authentication, such as by certificates, as described previously. Similarly, communications between the receiving agency server 20 and the web server 14 may be at least partially encrypted and subject to authentication.

Figure 2:
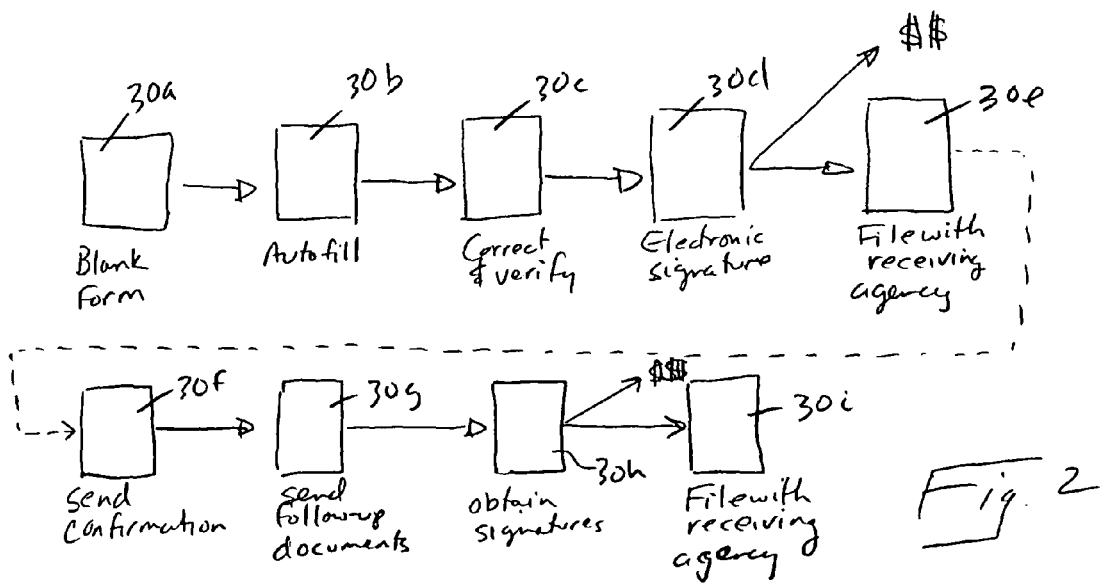
FIG. 2 illustrates the flow of documents in one embodiment of the present invention.

FIG. 2 illustrates a conceptual document flow over the WAN 12. It should be noted that this document flow is exemplary, and that other document flows are also within the scope of this invention. In FIG. 2, a blank form 30a is generated, preferably at the secure web server 14, in response to a client 16 request. In this example, the blank for 30a is a hypertext markup language (HTML) document, subscribing to standard Internet protocols. Next, an auto-filled document 30b is developed based upon client/applicant profiles selected by the client. A corrected document 30c is produced based upon feedback from the client, and is preferably verified for completeness in an automated fashion. If required, an electronic signature document 30d is developed with the electronic signature of the applicant, client, and/or client/applicant, as the case may be. The electronic document 30d is then ready for filing with the appropriate receiving agency, as shown at 30e. Any required fees can be paid or credited at the time of filing the electronic document 30d. Typically, the receiving agency will send a confirmation of receipt, which is processed and forwarded on to the client as a confirmation 30f. Follow-up documents 30g (such as documents to bear original signatures, amendments to the electronically filed documents, etc.) are then preferably automatically generated and forwarded to the client. If signatures are required, they are obtained at 30h and the follow-up documents, and any required fees, are forwarded to the receiving agency as indicated at 30i.

It will therefore be appreciated that a method for electronically filing documents in accordance with the present invention includes providing an HTML based form to a client machine coupled to a TCP/IP network, at least partially automatically filling-in the form based upon input from the client machine, verifying information on the form based upon stored heuristics, and submitting the form to a receiving agency over the network. The stored heuristics can be implemented in a variety of fashions, as will be appreciated by those skilled in the art, from default form box fill-in to rule based systems to expert systems. Additional information is usually added to the form based upon input from the client machine prior to verifying the information. In an embodiment of the invention, an electronic signature is obtained prior to submitting the form to the receiving agency. This electronic signature typically comes from the applicant machine 18, although it can come from the client machine 16 as well. The method can further include paying a filing fee to the receiving agency in conjunction with the submission of the form to the agency.

The method of the present invention can be embodied in a code segments stored in computer readable media. This computer readable media can be anywhere on the system 10, including being stored on magnetic media, in volatile or non-volatile memory, on optically readable media, etc. Segments may be stored on the servers 14 and 20, on the machines 16 and 18, on the wide area network 12, or elsewhere where it can be read by a computer coupled to the system.

It will therefore be appreciated that a computer readable media including code segments for electronically filing documents in accordance with the present invention can include a code segment providing an HTML based form to a client machine coupled to a TCP/IP network; a code segment at least partially automatically filling-in the form based upon input from the client machine; a code segment verifying information on the form based upon stored heuristics; and a code segment submitting the form to a receiving agency over the network. It can further include a code segment adding additional information to the form based upon input from the client machine prior to verifying the information, a code segment obtaining an electronic signature prior to submitting the form to the receiving agency, and/or a code segment paying a filing fee to the receiving agency in conjunction with the submission of the form to the agency.

Figure 3A:
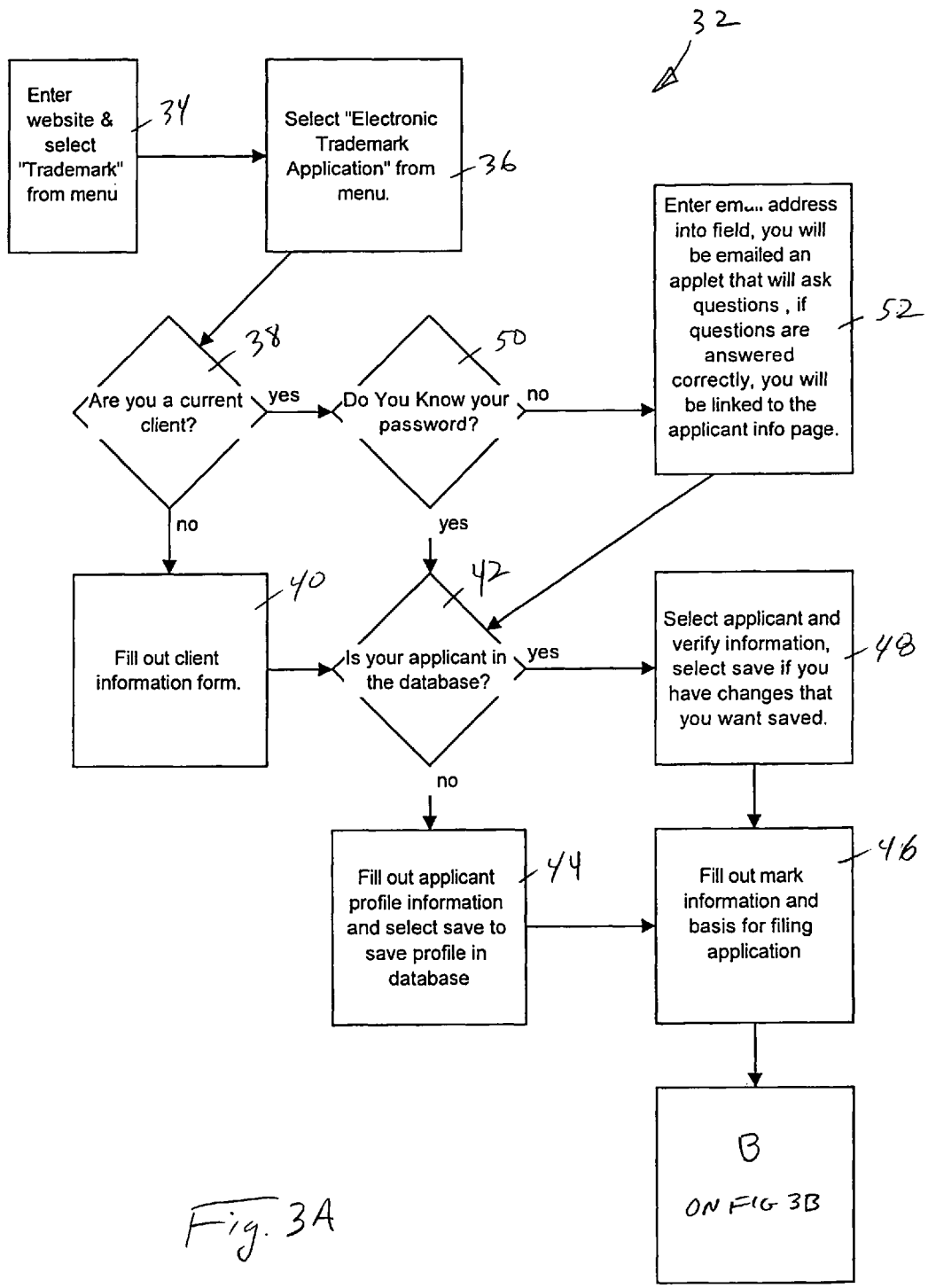
FIGS. 3A and 3B illustrate a process flow in accordance with the present invention.
Figure 3B:
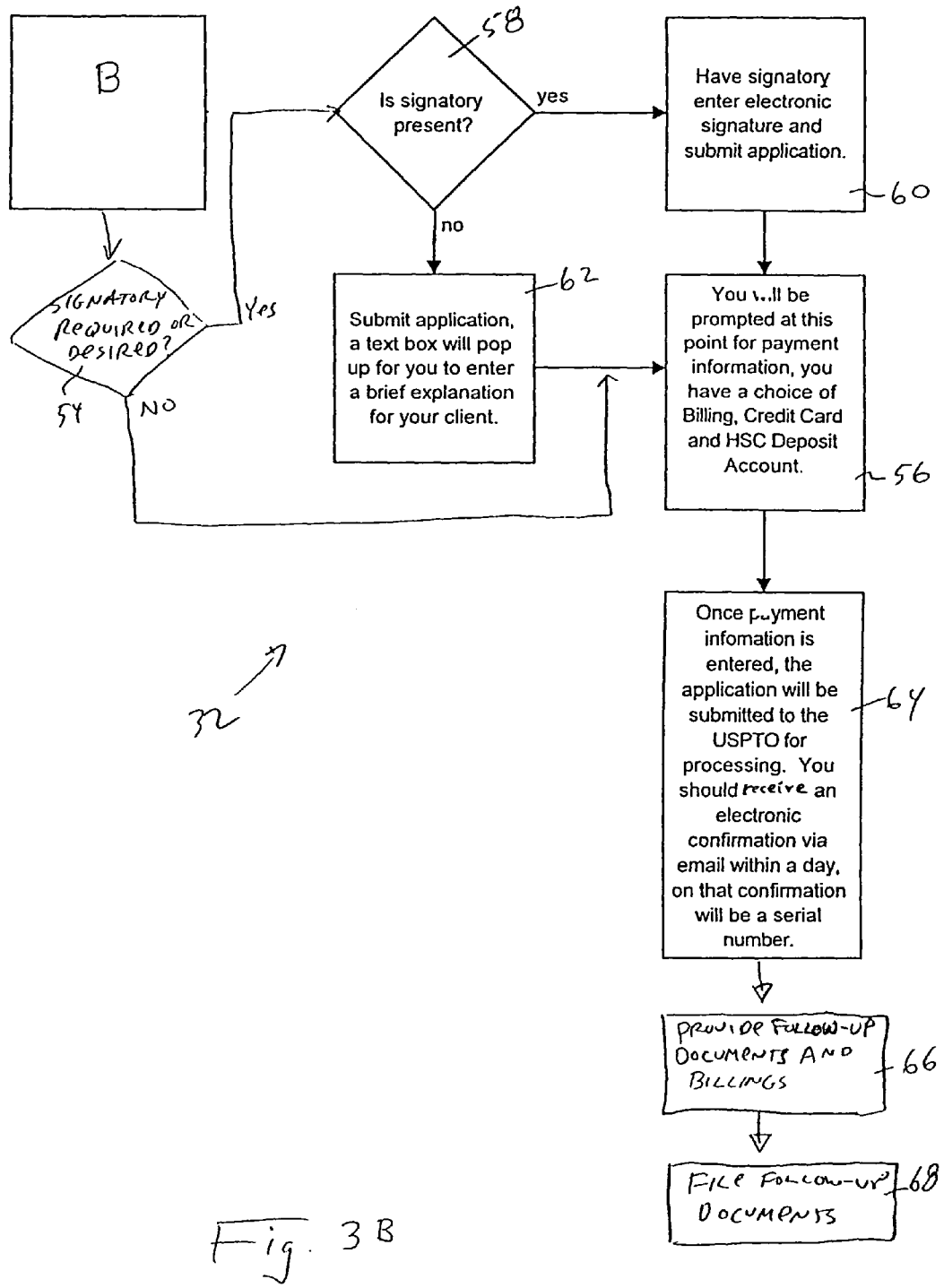

In FIGS. 3A and 3B, a process 32 for the electronic filing of documents over a WAN with a receiving agency. In this example, it is assumed that a Federal trademark application is being filed with the United States Patent and Trademark Office (USPTO). It will be appreciated, however, that process 32 is also applicable to other applications for electronic filing, such as with State and Federal Courts, Patent Cooperation Treaty (PCT) filings, etc. Therefore, while the process is described in terms of a particular example, those skilled in the art will appreciate the equivalent and analogous other applications for the present invention that are within the spirit and scope of this invention.

The process 32 is a combination of computer implemented processes and client and/or client/applicant interactions. The computer implemented portions of process 32 are primarily performed on the secure web server 14, client computer 16, applicant computer 18 (optional), and receiving agency computer 20, although some of the process may be implemented on Internet 12 resources, as will be appreciated by those skilled in the art. A preferred embodiment of the present invention has the majority of the computer implemented processes performed on the secure web server 14, with supplemental processes performed on client computer 16 and applicant computer 18. The client computer 16 and the applicant computer 18 preferably communicate with secure web server 14 through "web browser" software, such as web browsers provided as Microsoft Internet Explorer, Netscape Navigator, and America On Line (AOL), among others. Most preferably, the browser should be Applet enabled such that small programs provided by the secure web server 14 can be run within the web browser software.

In FIG. 3A, process 32 begins at 34 with the entry into the secure website and selecting the appropriate electronic document form. In this instance, it is the Federal Trademark form. This entry is performed by a client at a client computer 16 by using a web browser to "open" the web site hosted on the secure web server 14. This it typically accomplished by activating a "book mark" for the secure web site, or by typing in the Universal Resource Locator (URL) for the web site. An example of a URL is http://www.hickman.com.

Next, in a client act 36, the client selects the "Electronic Trademark Applicant" form from the menu. The web server 14 then asks the client whether it is a current client at 38. If not, this client is a first-time client of the system, and the client fills out a client information form at 40. It should again be noted that these interactions are occurring through the client computer 16 web browser, and therefore is preferably implemented in Internet technologies such as HTML, Applets, etc. The web server 14 then queries whether the applicant is in the database in an act 42. This is because there is not always unity between the client (i.e. the person or persons directing the filing of the electronic document) and the applicant (i.e. the person or persons who can authorize the filing of the electronic document). Further, a client may represent many applicants. If the applicant is not in the database, the user fills out the applicant profile information at 44 and stores the profile in the database. The client then, in an act 46, fills out the remaining mark information and verifies the correctness of the data. If it was determined at 42 that the applicant is currently in the database, the applicant is selected at 48 and the electronic is filled in to the extent possible based upon the client/applicant profile. The client then modifies the electronic document in act 46. If it was indicated at 50 that the client has forgotten his password, an act 52 will provide the password to him after he has answered questions which satisfy the secure server that he is a bona fide client.

By storing client and applicant profile information, much of the repetitive entry of data for multiple electronic documents can be eliminated. For example, if the client is Taiwan Patent and Trademark Agency, it may have many clients such as Taiwanese Company One, Taiwanese Company Two, Korean Company One, etc. In this example, assume that Taiwanese Company One, having Divisions One, Two and Three, contacts client Taiwan Patent and Trademark agency for the filing of a U.S. trademark application for its Division Two. Therefore, client can choose its client profile, and under its client profile the profile for Taiwanese Company One, and under Taiwanese Company One, Division Two, and under Division Two the type of application to be filed (e.g. Software in International Class 09, or printed matter in International Class 16). Based upon the stored profile information, a great many fields in the electronic document can be automatically filled. Depending upon the preferences of the client, the system can "guess" an appropriate entry for certain fields, such as type of use or description of the goods, based on any one of a number of heuristics. For example, the web server can look at historical entries into that field, impute a description of the goods based upon a class, impute a class based upon the description of the goods, etc.

Referring additionally to FIG. 3B, once the electronic document form has been filled and verified at 46, it is determined at 54 whether a signature of the applicant is required or desired. For example, the filing of Electronic Trademark Documents with the USPTO currently requires the applicant to provide an electronic signature. However, this requirement is said to be eliminated as of Nov. 1, 1999. Even so, it may be desirable to obtain an electronic signature even though it is not required to reduce the amount of follow-up activities. If a signature is not required or desired, payment arrangements with the client are made in an act 56. While many forms of payment are possible, three preferred methods are by credit card, by deposit account with the host of the web server 14, or by billing the client (once that client has been authorized by the web server 14).

If a signatory (e.g. applicant) is required or desired, it is determined at 58 whether the signatory is present at the client's site. If so, the signatory can make his or her electronic signature at the client machine 16, at which time process control is turned over to act 56. If the signatory is not present (e.g. he is at a remote site at an applicant computer 18), then the electronic document will be forwarded from the secure web server 14 to the applicant 18 for electronic signature.

In a preferred embodiment of the present invention, the payment act 56 is moved before the act 54 concerning the signatory. In this fashion, the electronic signature of the signatory is the last act before the transmission of the electronic document to the receiving agency. However, even if the payment act 56 is accomplished after the signature act, the signature act is the final step in the preparation of the electronic document itself.

Once the payment information has been entered, and act 64 submits the completed and preferably signed electronic document to the receiving agency, here the USPTO. The website takes care of any required filing fees or other payments using web host credit card information, web host deposit account information, electronic fund transfers (EFT), etc. The receiving agency typically provides one or more confirmations to the web server 14, which are processed and forwarded on to the client 16 and/or the applicant 18.

The next act of the web server 14 is to prepare and forward follow-up documents to the client and/or applicant. These documents can, for example, include documents providing an original signature of the applicant, amendments to the filed electronic documents, etc. These follow-up documents are preferably prepared in a standard word processing format such as "rich text", and may be provided, for example, as Microsoft Word documents or HTML documents. These documents, once received by the client and/or applicant, may be printed out at the client computer 16 and/or client computer 18, signed, if necessary, and forwarded by an appropriate route to the receiving agency 20 in an act 68.

FIGS. 4A, 4B, 5A, 5B, and 6-10 are pages of exemplary HTML used to create an input form for the electronic document to be filed with the receiving agency. As seen in FIG. 4A, a client is asked for a Client ID and a password. This forms one level of protection. An additional level of protection is provided by having the web server 14 check that the request is coming from an appropriate Internet Protocol (IP) address. For example, if it is coming from one of a range of IP addresses for client Korean Client One, then the transaction can continue. A third level of protection is provided by providing the client with a physical or software "dongle" for a designated computer or computers. With a dongle, information is physically stored at the designated computers (either with an external, hardware dongle attached to an I/O port of the computer or as data on, for example, the hard drive of the computer) such that only those computers can be used to interact with the web site. The implementation of these forms of protection are known to those skilled in the art. If the client is an existing client, the client information is automatically filled in by the web server. If not, the new client fills in the information. An example of the filled in HTML page is shown in FIG. 4B.

It should be noted, that in the current implementation, that the pages illustrated in FIGS. 4A and 4B are the only "purely" HTML pages in this example. After the "log-in" button of FIG. 4A/4B is activated, and the client is "logged-in", the remaining pages are preferably generated on the fly, such as through the use of JAVA™ servlets or the like. The advantage of this approach is that an extra level of security is added to the system in that it insulates the client and/or applicant from the displayed pages.

Next, in FIG. 5A, and applicant is selected from a pull-down menu P, and the applicant information is automatically filled in. If this is the first time this system has been used for this applicant, the client manually fills in the fields and the data is stored. It should be noted that an applicant can have multiple subsidiaries, parents, or affiliated companies. These can be considered separate applicants, or instances of the current applicant, as desired by the client. An example of a filled in HTML page of FIG. 5A is shown at FIG. 5B.

FIG. 6 is an HTML page which provides a way to enter new applicant information. FIG. 7 allows the entry of Attorney and Domestic Representative information. The Attorney must, in general, either be a U.S. practicing attorney or a foreign attorney from a foreign country which allows U.S. attorneys to file trademark applications with that foreign country. Therefore, for foreign applicants, the attorney information will generally default to a participating U.S. attorney who is a member of one of the State Bars or of the Bar of Washington D.C. The Domestic Representative field will also likely default to the participating U.S. attorney, since foreign applicants are required to have a Domestic Representative for service of process.

FIGS. 8 and 9 are HTML pages which provide information concerning the trademark itself. Some of these fields can be automatically filled by the web server based upon client/applicant profiles and a variety of heuristics, as explained above. The fields can then be edited by the client and/or client/applicant.

Page 10 is an HTML page with the electronic signature block S to be signed by the applicant. As explained previously, this signature block 10 must be signed by the actual applicant after the form has been otherwise completely filled-in, and not by any attorney or other non-applicant representative. The signature can be obtained at the client machine 16 if the applicant is the client or if the applicant is present at the client machine 16, or at the applicant machine 18. The electronic document is then ready for filing with the receiving agency.

While this invention has been described in terms of several preferred embodiments, it is contemplated that alternatives, modifications, permutations and equivalents thereof will become apparent to those skilled in the art upon a reading of the specification and study of the drawings. It is therefore intended that the true spirit and scope of this invention as set forth in the following appended claims be interpreted so as to include all such alternatives, modifications, permutations and equivalents.

What is claimed is:

1. An automated electronic filing system comprising:
a web server coupled to the Internet;
a receiving agency server separate from said web server and coupled to the Internet such that it is capable of communication with said web server, wherein communication between said receiving agency server and said web server is subject to authentication and is at least partially encrypted;
a client machine separate from said web server and said receiving agency server and coupled to the Internet for communication with said web server, wherein communication between said client machine and said web server is subject to authentication and is at least partially encrypted, wherein said web server provides said client machine with a form which can be verified by said web server using heuristics, said client machine providing information to said web server forming at least a part of an electronic document to be filed with said receiving agency server by said web server in a manner that said web server serves as an interface to said receiving agency computer for said client machine, said electronic document filed for further processing by a receiving agency associated with said receiving agency server in accordance with a procedure for which said receiving agency is in some manner responsible; and
wherein said web server automatically produces at least a portion of said electronic document in response to a selection originating from said client machine, wherein said form includes at least one of a blank form and a partially filled-in form based upon information stored on said web server, wherein said form can be at least partially automatically filled-in in response to said selection, wherein said web server automatically updates docketing information, and wherein said web server transacts a financial transaction with said receiving agency server on behalf of said client machine.

2. An automated electronic filing system as recited in claim 1 further comprising an applicant machine coupled to the Internet.

3. An automated electronic filing system as recited in claim 2 wherein said applicant machine communicates with said web server the Internet.

4. An automated electronic filing system as recited in claim 3 wherein communications between said applicant machine and said web server are at least partially encrypted.

5. An automated electronic filing system as recited in claim 4 wherein communications between said applicant machine and said web server are subject to authentication.

6. An automated electronic filing system for use in electronic prosecution of trademark applications comprising:
a web server coupled to a wide area network;
a receiving agency server separate from said web server and coupled to said wide area network such that it is capable of communicating with said web server, said receiving agency server associated with a governmental agency responsible for the administration of trademark registration;
a client machine separate from said web server and said receiving agency server and coupled to said wide area network for communication with said web server, such that said web server serves as an interface to said receiving agency server, said client machine providing information to said web server forming at least a part of an electronic document related to prosecution of a trademark application or maintenance of a trademark registration, said electronic document to be filed with said receiving agency server by said web server in a manner that said web server serves as an interface to said receiving agency computer, said electronic document filed for further processing by said governmental agency in accordance with preestablished rules;

wherein said web server automatically produces at least a portion of said electronic document in response to a selection originating from said client machine, wherein said web server provides said client machine with a form, wherein said form can be at least partially automatically filled-in in response to said selection; and wherein said web server serves as an interface between said client machine and said receiving agency server, and wherein said web server makes a payment to said government agency for the filing of said electronic document.

7. An automated electronic filing system comprising:

a web server capable of communicating over the Internet;

a receiving agency server separate from said web server and capable of communicating over the Internet, said receiving agency server associated with a governmental agency;

a client machine separate from said web server and said receiving agency server and capable of communicating over the Internet, such that said web server serves as an interface to said receiving agency server, said client machine providing information to said web server forming at least a part of an electronic document, said electronic document to be filed with said receiving agency server by said web server for further processing by said governmental agency in accordance with pre-established rules, wherein said web server serves as an interface between said client machine and said receiving agency server, whereby said receiving agency server communicates with said web server as if said receiving agency server were communicating directly with said client machine; and wherein said web server makes a payment to said governmental agency on behalf of a client for the filing of said electronic document.

8. A communications system comprising:

a client computer coupled to the Internet;

an applicant computer coupled to the Internet and communicating with said client computer;

an intermediary server coupled to the Internet communicating with said client computer, said client computer serving as an intermediary between said applicant computer and said intermediary computer; and a recipient server coupled to the Internet and communicating with said intermediary server, said intermediary server serving as an interface between said client computer and said recipient server, whereby said recipient server communicates with said intermediary server as if said recipient server were communicating directly with said applicant computer.

* * * * *